(12) United States Patent
Erickson et al.

(10) Patent No.: US 9,875,592 B1
(45) Date of Patent: Jan. 23, 2018

(54) DRONE USED FOR AUTHENTICATION AND AUTHORIZATION FOR RESTRICTED ACCESS VIA AN ELECTRONIC LOCK

(71) Applicant: INTERNATIONAL BUSINESS MACHINES CORPORATION, Armonk, NY (US)

(72) Inventors: Thomas D. Erickson, Minneapolis, MN (US); Kala K. Fleming, Nairobi (KE); Clifford A. Pickover, Yorktown Heights, NY (US); Komminist Weldemariam, Nairobi (KE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/251,485

(22) Filed: Aug. 30, 2016

(51) Int. Cl.
*G07C 9/00* (2006.01)
*B64C 39/02* (2006.01)

(52) U.S. Cl.
CPC .......... *G07C 9/00309* (2013.01); *B64C 39/02* (2013.01); *G07C 9/00563* (2013.01); *B64C 2201/127* (2013.01); *G07C 2009/00793* (2013.01)

(58) Field of Classification Search
CPC ............ G07C 9/00309; G07C 9/00563; G07C 2009/00793; B64C 39/02; B64C 2201/127
See application file for complete search history.

(56) References Cited

U.S. PATENT DOCUMENTS

| 5,774,059 A | 6/1998 | Henry et al. |
| 2014/0267740 A1 | 9/2014 | Almomani |
| 2017/0124789 A1* | 5/2017 | Rephlo ............ G07C 9/00087 |

FOREIGN PATENT DOCUMENTS

WO 2014093436 6/2014

* cited by examiner

*Primary Examiner* — Leon Flores
(74) *Attorney, Agent, or Firm* — F. Chau & Associates, LLC

(57) ABSTRACT

In an electronic lock authentication method using a drone, authentication information input by a person is received at an electronic lock, a first level verification of the authentication information is performed at the electronic lock, and a drone request signal is transmitted from the electronic lock to the drone. The drone request signal instructs the drone to proceed to the electronic lock and perform a second level verification of the person when the first level verification has passed. Further in the method, the second level verification of the person is performed with the drone, a grant access signal is transmitted from the drone to the electronic lock, the grant access signal instructs the electronic lock to unlock when the second level verification has passed, and the electronic lock is unlocked in response to the grant access signal.

20 Claims, 16 Drawing Sheets

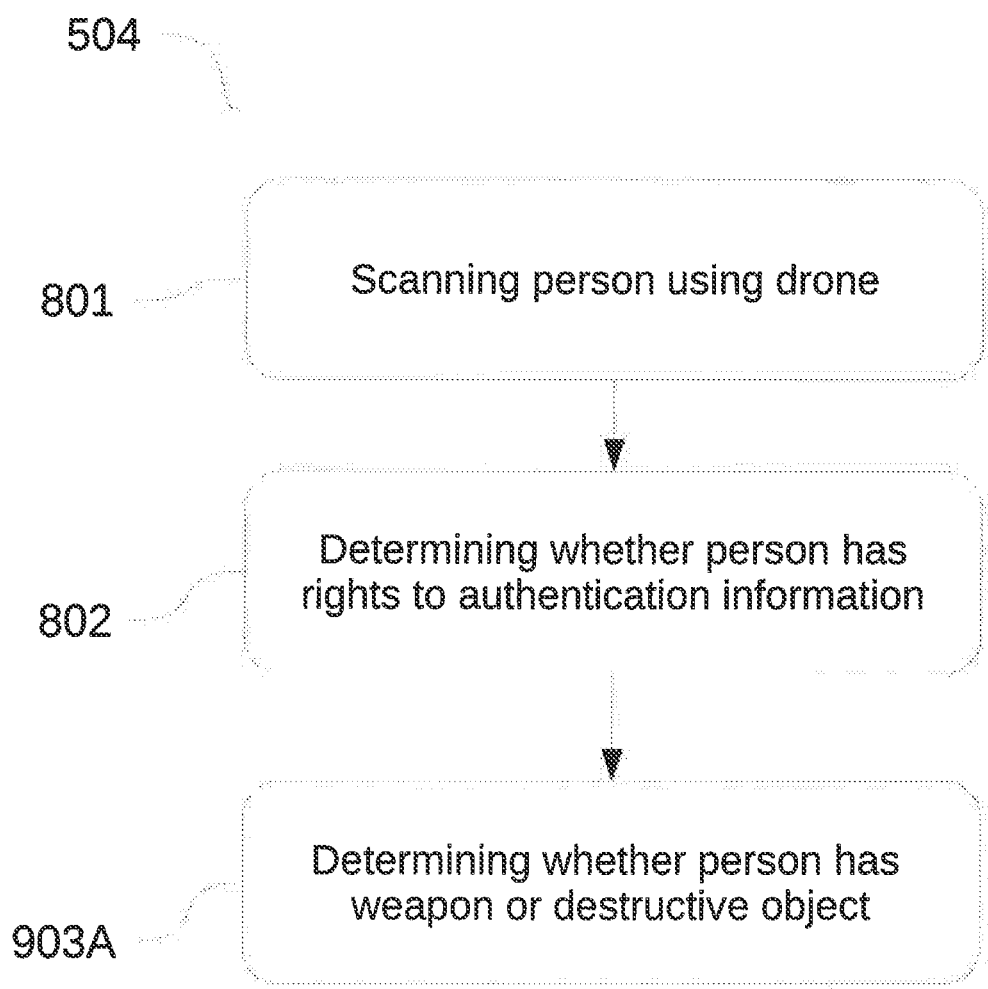

DRONE USED FOR AUTHENTICATION AND AUTHORIZATION FOR RESTRICTED ACCESS VIA AN ELECTRONIC LOCK

TECHNICAL FIELD

Exemplary embodiments of the inventive concept relate to a method and system for electronic lock authentication using a drone.

DISCUSSION OF RELATED ART

An electronic lock is a locking device operated by electric current. Electronic locks may be unlocked, without a physical key, through authentication of authentication information, such as alphanumeric codes, passwords, passphrases, biometric input (e.g., fingerprint scanning, retinal/iris scanning, voice print identification), security tokens (e.g., within a smart card), radio-frequency identification (RFID) (e.g., within a key fob), etc. Electronic locks can also be connected to an access control system, which can add/remove "keys", limit access to certain times/dates, keep a log of access attempts, remotely lock/unlock the electronic locks, remotely monitor the electronic locks, etc.

Electronic locks may be supplemented by other devices for increased security. For example, stationary cameras may be placed near an electronic lock to capture images, video, and/or audio. These may be analyzed for additional authentication and verification. Although stationary cameras may be configured to swivel and/or be controlled manually, they may have blind spots. Additionally, stationary cameras, being limited in their viewing angles, may have difficulty picking up facial features or other nuances. For example, a person may have his head lowered or may be wearing a hat, thus impeding facial recognition.

Cybersecurity has grown increasingly important given the rising value of electronic data. Electronic locks are one tool among many for perimeter-based, physical security to prevent cyber attacks and safeguard data.

SUMMARY

According to an exemplary embodiment of the inventive concept, an electronic lock authentication method using a drone is provided. Authentication information input by a person is received at an electronic lock. A first level verification of the authentication information is performed at the electronic lock. A drone request signal is transmitted from the electronic lock to the drone. The drone request signal instructs the drone to proceed to the electronic lock and perform a second level verification of the person when the first level verification has passed. The second level verification of the person is performed with the drone. A grant access signal is transmitted from the drone to the electronic lock. The grant access signal instructs the electronic lock to unlock when the second level verification has passed. The electronic lock is unlocked in response to the grant access signal.

According to an exemplary embodiment of the inventive concept, a system for authenticating an electronic lock using an unmanned aerial vehicle (UAV) includes the electronic lock and the UAV. The electronic lock includes a locking mechanism, an input, and a transceiver. The input is configured to receive authentication information from a person, and the transceiver is configured to output a drone request signal when the authentication information has passed. The UAV includes a transceiver and a processor. The transceiver of the UAV is configured to receive the drone request signal, and the processor is configured to instruct the UAV to fly to a location near the electronic lock and to verify the identity of the person. When the identity of the person is verified, the transceiver of the UAV outputs a grant access signal instructing the electronic lock to unlock itself.

According to an exemplary embodiment of the inventive concept, a method of releasing a lock using a drone is provided. A first signal is received at the drone. The first signal indicates a first person has passed a first verification step. The drone is moved to a proximate location of the first person. Authentication information of the first person is obtained with the drone. A second signal, based on the authentication information, is transmitted from the drone. The second signal indicates that the first person has passed a second verification step.

BRIEF DESCRIPTION OF THE DRAWINGS

The above and other features of the inventive concept will become more apparent by describing in detail exemplary embodiments thereof, with reference to the attached drawings.

DETAILED DESCRIPTION OF THE EMBODIMENTS

Figure 1:
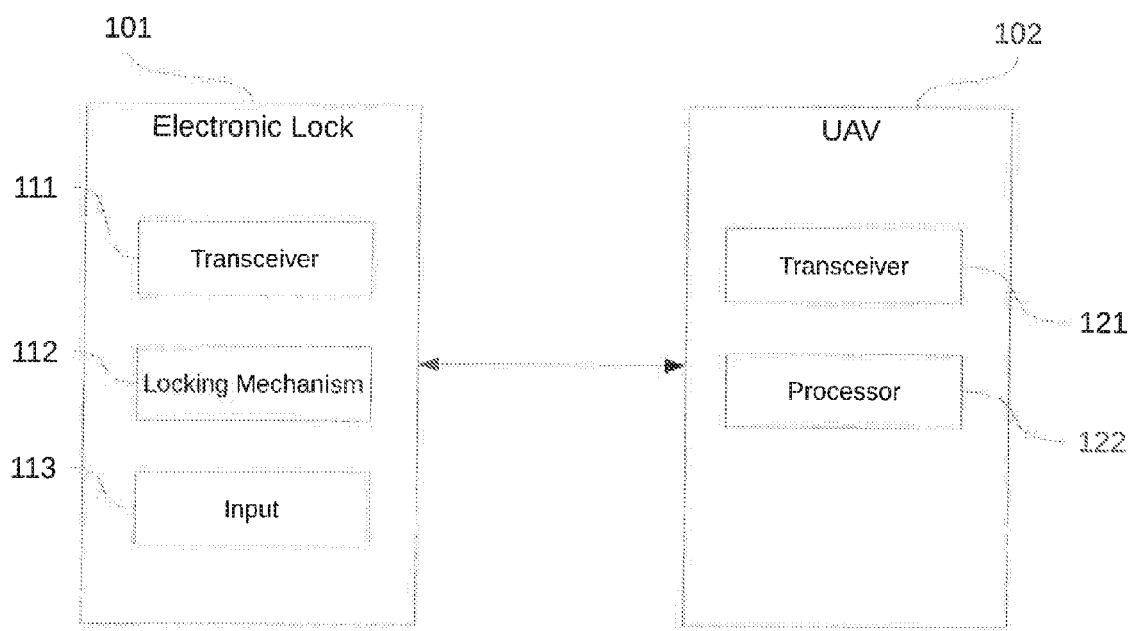
FIG. 1 illustrates a system for authenticating an electronic lock using an unmanned aerial vehicle (UAV) according to an exemplary embodiment of the inventive concept.

Exemplary embodiments of the inventive concept provide for an electronic lock authentication system and method with an electronic lock that sends a signal to a flying drone configured for authentication and authorization. The signal may be automatically triggered by a person entering a code on a cipher lock, using a security token (e.g., a smart card), inputting biometric information (e.g., fingerprint, iris, or retinal scan, voice print identification), activating a motion sensor or video sensor, etc. The signal indicates a need or request for the drone to fly to a location near the electronic lock. The drone may perform an authentication procedure by scanning the person (or people) through visual, audio, biometric, or other means, and may send a signal to grant or deny access. The electronic lock may change status and unlock to allow the person to enter, based on the signal from the drone.

By performing a secondary verification with the drone, an additional layer of security is added for restricting and/or authenticating access to electronic locks. This configuration allows for real-time authentication and authorization using cognitive reasoning engines, deep learning, etc. Performing secondary verification may be useful in several scenarios. For example, a group of people may attempt to enter the place secured by the electronic lock using the authorization of a single person (e.g., tailgating). An unauthorized person may attempt to enter by using illegitimately or illegally obtained authentication information, such as a stolen password or smart card. An authorized person may attempt to enter under duress due to a proximate or remote threat. In these situations, secondary verification performed by drones may successfully prevent access.

Verification and analyses performed by the drone may use deep learning, neural networks, etc. The drone may be connected to backend intelligence on a cloud or on-premises for more processing power and access to external data sources and analytics. As such, accuracy and reliability of verification may be increased.

In comparison to stationary cameras, the drone is able to fly and thus can maneuver in three dimensions. As such, it may provide superior viewing angles and 360 degrees of coverage. Additionally, by having flying capabilities, the drone would not have to be permanently disposed near the electronic lock. As such, an unscrupulous or malicious person would not have ready access to the drone, making it more difficult to tamper with, unlike fixed security features or mechanisms such as cameras or keypads.

Exemplary embodiments of the inventive concept will be described more fully hereinafter with reference to the accompanying drawings. Like reference numerals may refer to like elements throughout the specification and drawings.

FIG. 1 illustrates a system for authenticating an electronic lock using an unmanned aerial vehicle (UAV) according to an exemplary embodiment of the inventive concept.

Referring to FIG. 1, the system may include an electronic lock 101 and a UAV 102. The electronic lock 101 may include a transceiver 111, a locking mechanism 112, and an input 113. The UAV 102 may include a transceiver 121 and a processor 122, and is able to fly.

The locking mechanism 112 is capable of moving between a locked position and an unlocked position and is connected to a circuit configured to control the position of the locking mechanism 112. For example, the locking mechanism 112 may be a deadbolt that moves in response to an electronic signal to the circuit.

The electronic lock 101 may be disposed on or near a door or entranceway. However, the inventive concept is not limited thereto. For example, the electronic lock 101 may secure access to a piece of machinery, a vehicle, etc. When the electronic lock 101 is released, it may allow access to or turn on a device, apparatus, system, etc.

The input 113 may be configured to receive authentication information (or credentials) from a person, e.g., an individual seeking to unlock the electronic lock 101. The input 113 may be at least one of a keypad, a card reader, a biometric input (e.g., fingerprint scanner), a radio-frequency identification (RFID) sensor/device, etc. As an example, a circuit of the input 113 may include a contact or proximity sensor that detects when a person is within a certain range of an RFID device. When the person is detected, the sensor may generate an electrical signal to activate the RFID device for a predetermined amount of time. During the predetermined amount of time, the RFID device may attempt to read an access code (the authentication information) from a device in the person's possession, such as a key fob.

The transceiver 111 of the electronic lock 101 may be configured to output a drone request signal when the authentication information is passed or approved. The authentication information from the input 113 may be verified by, for example, using a database connected to the electronic lock 101.

The transceiver 121 of the UAV 102 may be configured to receive the drone request signal. The processor 122 may be configured to instruct the UAV to fly to a location near the electronic lock 101 and verify the identity of the person. When the identity of the person is verified, the transceiver 121 outputs a grant access signal instructing the electronic lock 101 to unlock. The grant access signal may be transmitted directly to the electronic lock 101, or may be transmitted to an external computer that sends an unlock instruction to the electronic lock 101.

According to an exemplary embodiment of the inventive concept, the UAV 102 may be configured to periodically fly to the electronic lock 101 for remote monitoring, regardless of whether the drone request signal is sent.

The transceiver 111 and the transceiver 121 may be configured to communicate with each other. The transceivers 111 and 121 may communicate wirelessly using Wi-Fi, BLUETOOTH, radio frequency (RF), infrared (IR), satellite, etc. However, the inventive concept is not limited thereto. For example, the UAV 102 may be connected to a docking station and the transceiver 111 may use a wired connection to communicate with the transceiver 121 via the docking station. Additionally, signals transmitted between the transceiver 111 and the transceiver 121 may be encrypted.

Figure 2:
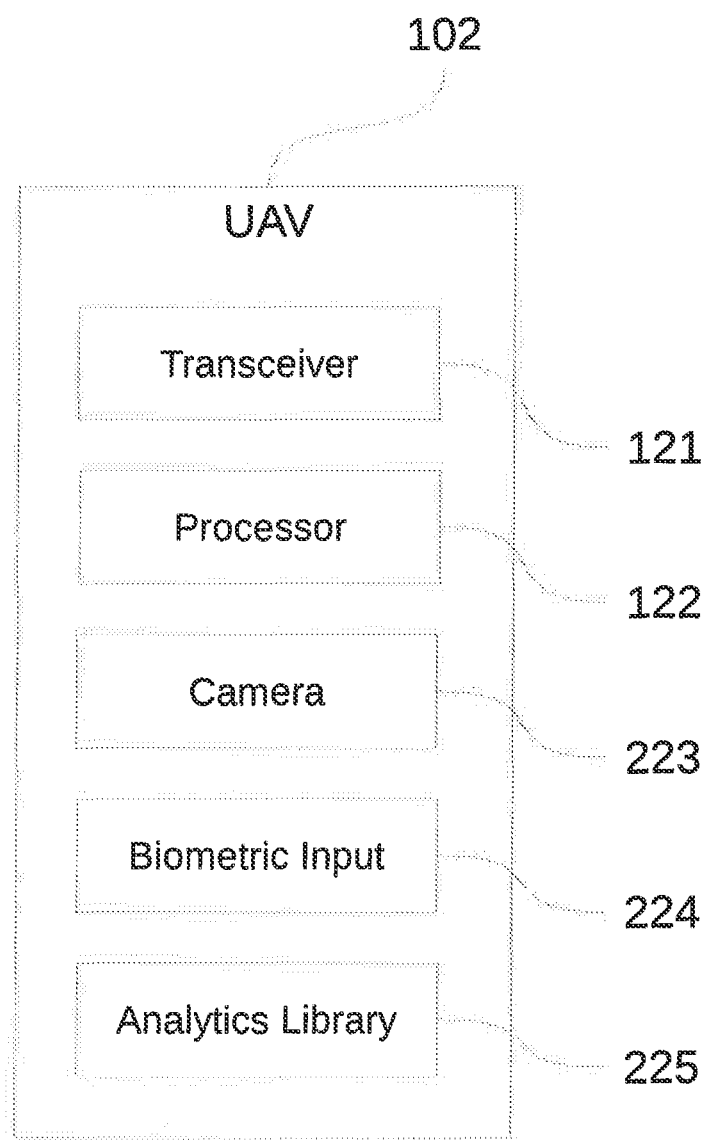
FIG. 2 illustrates an example of the UAV of FIG. 1 according to an exemplary embodiment of the inventive concept.

FIG. 2 illustrates an example of the UAV of FIG. 1 according to an exemplary embodiment of the inventive concept.

Referring to FIG. 2, the UAV 102 may include the transceiver 121, the processor 122, and at least one of a camera 223, a biometric input 224, and an analytics library 225. The transceiver 121 and the processor 122 may be configured as described with reference to FIG. 1. According to an exemplary embodiment of the inventive concept, the UAV 102 may include other sensors, such as a microphone, an infrared (IR) sensor, etc.

The camera 223 may be configured to visually inspect the person at many different angles and capture media content (e.g., image, video, audio, etc.) of the person. The media content may be analyzed by the processor 122 and the analytics library 225 to verify the identity of the person. Alternatively, the transceiver 121 may transmit the media content to an external computer for analysis.

The biometric input 224 may include a fingerprint scanner/reader, a retina or iris scanner, etc. According to an exemplary embodiment of the inventive concept, after receiving the drone request signal, the processor 122 may instruct the UAV 102 to obtain authentication information from the person using the biometric input 224 for additional verification. According to an exemplary embodiment of the inventive concept, the person may be required to place one finger on a biometric input of the electronic lock 101 and another finger on the biometric input 224 of the UAV 102 at substantially the same time for authentication.

The analytics library 225 may be connected to and work with the processor 122 to perform verification and data analysis. As described above, the analytics library 225 may analyze data captured by the camera 223 or the biometric input 224, and may use deep learning or a neural net to perform the analysis.

Figure 3:
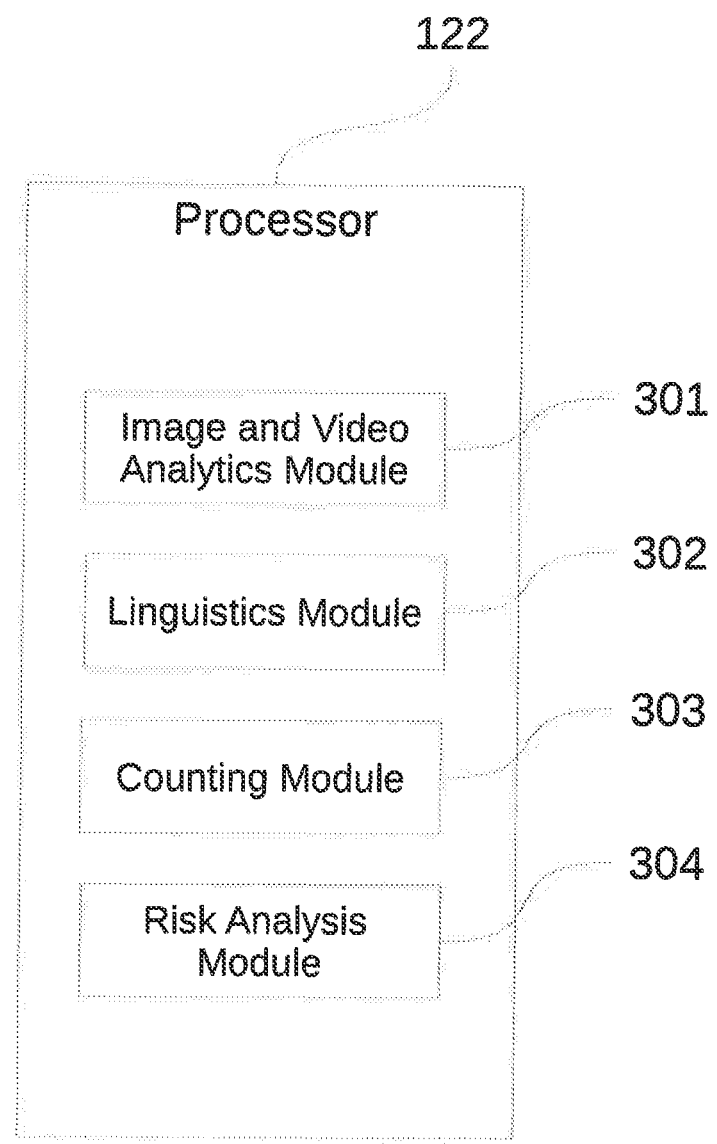
FIG. 3 illustrates an example of the processor of the UAV of FIG. 2 according to an exemplary embodiment of the inventive concept.

FIG. 3 illustrates an example of the processor of the UAV of FIG. 2 according to an exemplary embodiment of the inventive concept.

Referring to FIG. 3, the processor 122 of the UAV 102 may include an image and video analytics module 301, a linguistics module 302, a counting module 303, and a risk analysis module 304. The plurality of modules enables the processor 122 of the UAV 102 to perform advanced reasoning and analyses.

The image and video analytics module 301 may be configured to detect, locate, track, identify, interpret, and analyze moving and fixed/stationary objects near the electronic lock 101 using deep learning, a neural net, etc. The image and video analytics module 301 may process image and video data in real-time and may be able to identify people near the electronic lock 101 through facial recognition and other means.

The linguistics module 302 may be configured to analyze media content (e.g., audio/video data) extracted from the camera 223 and other audio/video sensors on the UAV 102. The linguistics module 302 may determine the number of people near the electronic lock 101 based on the audio data. Furthermore, the linguistics module 302 may perform an emotion/personality analysis and determine the affective or cognitive states of people near the electronic lock 101 based on the media content and contextual data. The personality analysis may be performed depending on the security level of the place secured by the electronic lock. Based on the personality analysis, access may be denied even if a person is authorized to enter. For example, if an authorized person is in a distracted state, access may be denied for the person's safety and to prevent possible damage to the place secured by the electronic lock. The distracted state may be identified by analyzing and detecting the affective or cognitive behaviors of the person from facial expressions, speech, etc. The analysis of these behaviors is triggered depending on the context of the place (e.g., security level is high, safety is a major concern, etc.).

The counting module 303 may be configured to count the number of people in proximity to the electronic lock 101. Counting may be performed through visual or auditory means, e.g., by analyzing video, image, and/or audio data. For example, data captured by an infrared sensor on the UAV 102 may be used to determine the number of people.

The risk analysis module 304 may be configured to determine the probability that detected behavior may be related to risky or unsafe behavior based on similar behavior arising from past incidents and contextual data. The risk analysis module 304 may also determine the expected risk level if the person is authorized to enter.

The UAV 102 may include additional modules as well. For example, a module may be configured to detect and analyze dangerous objects (e.g., guns, weapons, explosives, etc.) carried by the person using deep learning, a neural net, etc. The analysis results may be compared with the personality analysis to determine whether the drone should take amelioration action and/or deny access to the person. Alternatively, such a function may be performed by the image and video analytics module 301.

Moreover, the plurality of modules in the UAV 102 may share information with one another to better perform the relevant analyses. For example, an analysis may be performed to determine whether the people near the electronic lock 101 are affected by stress, fatigue, drugs, alcohol, etc. The image and video analytics module 301 may analyze the facial expressions and movements of the people (e.g., sluggish movement possibly indicating fatigue or intoxication). The linguistics module 302 may detect slurred speech, erratic speech patterns, stress patterns in speech, etc. Additional sensors such as smell sensors (e.g., an electronic nose) or chemical sensors may detect the presence of drugs or alcohol. In combination, the UAV 102 may perform the analysis with greater accuracy and confidence.

Figure 4:
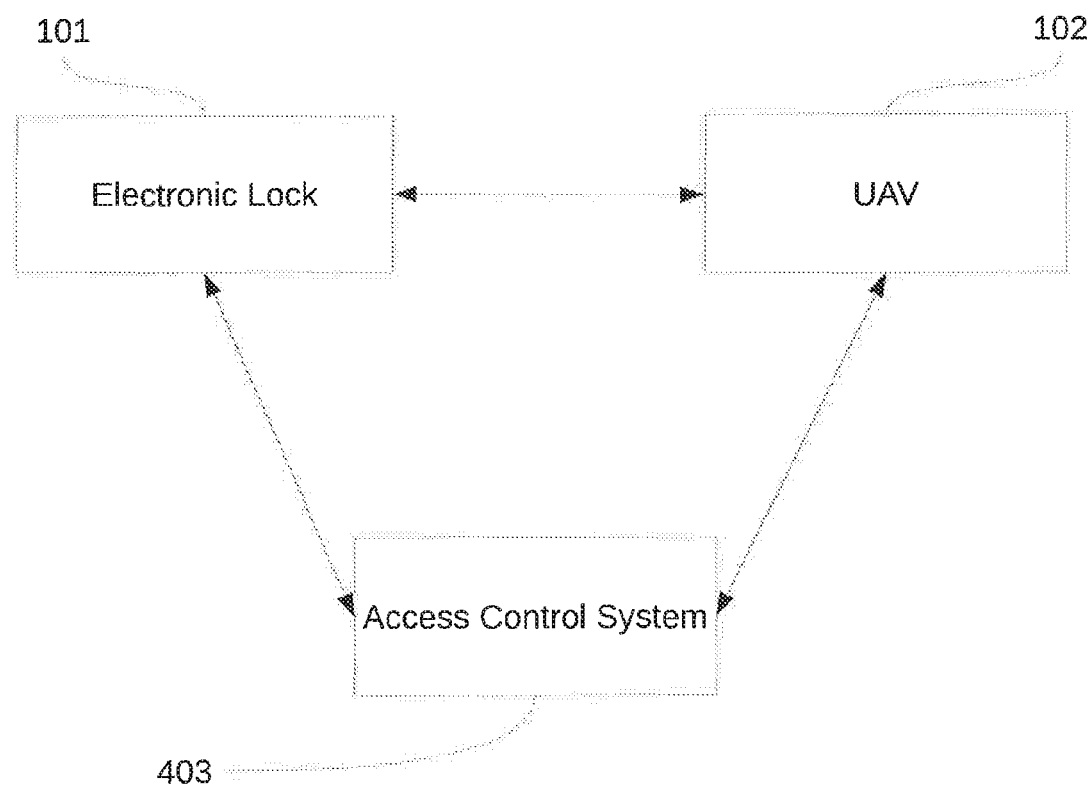
FIG. 4 illustrates a system for authenticating an electronic lock using a UAV and an access control system according to an exemplary embodiment of the inventive concept.

FIG. 4 illustrates a system for authenticating an electronic lock using a UAV and an access control system according to an exemplary embodiment of the inventive concept.

Referring to FIG. 4, the system may include the electronic lock 101, the UAV 102, and an access control system 403. The electronic lock 101 and the UAV 102 may be configured as described with reference to FIG. 1. Additionally, the electronic lock 101 and the UAV 102 may be configured to communicate with the access control system 403.

The access control system 403 may include a communication component, e.g., a transceiver, to communicate with the electronic lock 101 and the UAV 102. According to an exemplary embodiment of the inventive concept, the UAV 102 may send the grant access signal to the access control system 403, which will send an unlock instruction to the electronic lock 101. Alternatively, if verification of the person fails, the UAV 102 may send a signal, indicating that an unauthorized attempt was made, to the access control system 403. The access control system 403 may be further configured to communicate with the owner of the system and/or authorities (e.g., the police) upon successful and/or unsuccessful verification of the person. Operations involving the access control system 403 will be described in more detail below.

According to an exemplary embodiment of the inventive concept, the UAV 102 may be powered independently of the other components of the system. For example, if power to the electronic lock 101 or access control system 403 is disabled, the UAV 102 may be configured to automatically fly to the electronic lock 101 for inspection.

Figure 5:
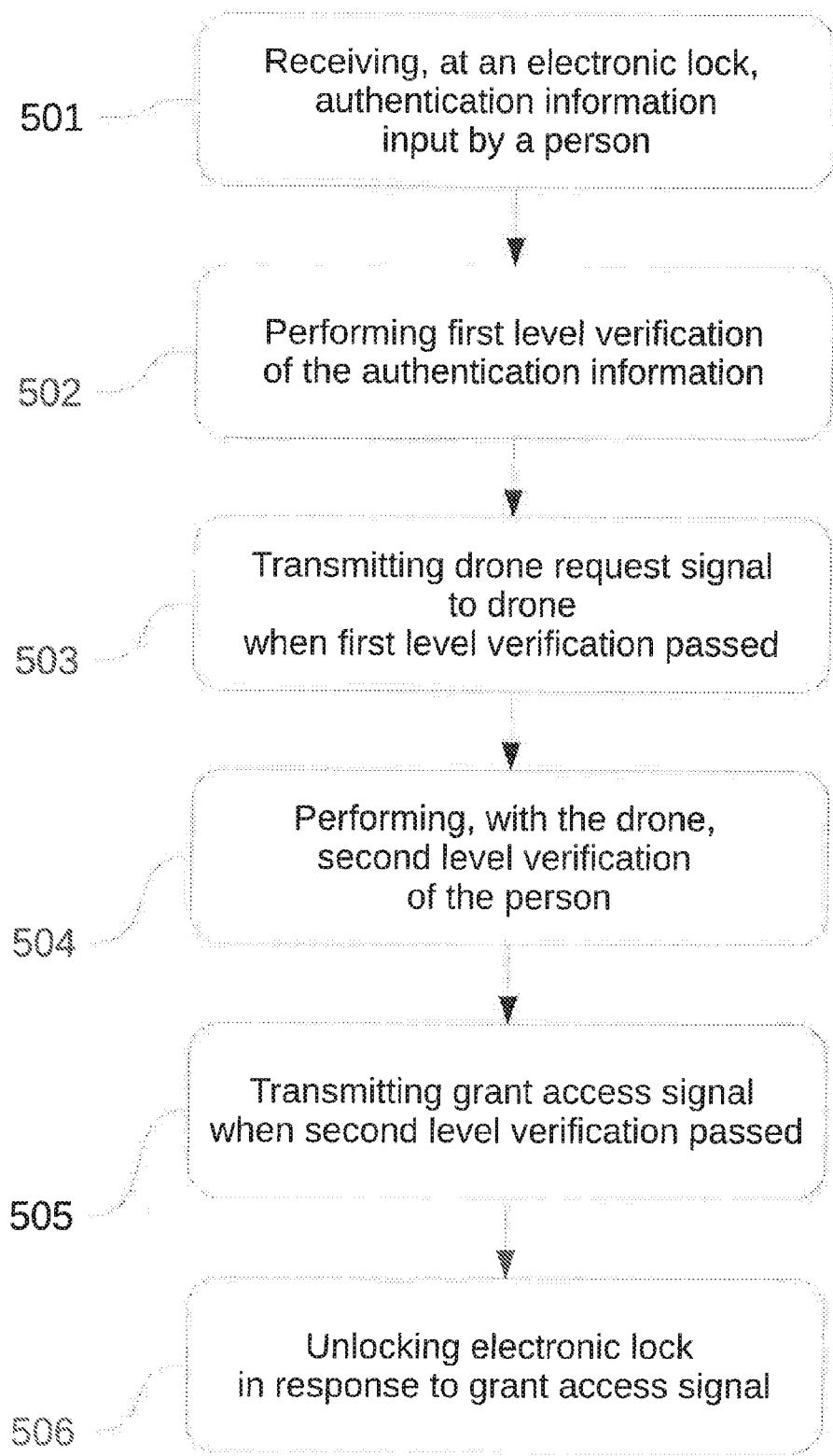
FIG. 5 illustrates an electronic lock authentication method according to an exemplary embodiment of the inventive concept.

FIG. 5 illustrates an electronic lock authentication method according to an exemplary embodiment of the inventive concept.

Referring to FIG. 5, a person may approach an electronic lock (e.g., the electronic lock 101 of FIG. 1). As described above, the electronic lock may be disposed on or near a door and configured to provide access to the door when unlocked. The electronic lock may receive authentication information input by the person (operation 501). As described above, the authentication information may include an alphanumeric code, a password, a passphrase, a PIN code, a security token, biometric input (e.g., fingerprint scan, voice recognition, etc.), a radio frequency identification (RFID), a card/badge swipe/insertion, a user gesture, etc. The electronic lock may perform a first level verification of the authentication information (operation 502).

If the first level verification is passed, the electronic lock may transmit a drone request signal (or a need signal) to a drone (e.g., the UAV 102 of FIG. 1) (operation 503). The drone request signal instructs the drone to proceed, e.g., fly, to the electronic lock and perform a second level verification of the person. The drone request signal may indicate that the first level verification is passed.

According to an exemplary embodiment of the inventive concept, the drone may be configured to arrive within a certain period of time. The period of time may be relatively short, e.g., one minute.

The drone may move to a proximate location of the person. The drone performs the second level verification of the person (operation 504). The second level verification may be performed electronically by obtaining authentication information from the person, e.g., through image/video/audio scan and analysis, biometric input, etc., as described above. Alternatively, the second level verification may be performed mechanically, where the person must insert a key into the drone.

The drone may automatically perform the second level verification through software algorithms. Alternatively, the drone may transmit an image or video to a person for manual verification and approval. The drone may also attempt to perform the second level verification automatically and, when a confidence level is low, the drone may communicate with a person for manual verification and approval.

According to an exemplary embodiment of the inventive concept, the drone may detect more than one person, or a group, near the electronic lock by using the counting module 303 of FIG. 3. Upon detecting the presence of a group, the drone may orchestrate entry by communicating to the group and requiring people in the group to spatially separate (e.g., to prevent tailgating) before proceeding with the second level verification on an individual basis. The drone may require the spatial separation to be large enough that only one person may gain access at a time (e.g., locking the electronic lock after each entry and then performing the second level verification on the next person). If the group refuses to comply with the drone's instructions, the drone may deny access. According to an exemplary embodiment of the inventive concept, the drone may simply deny access if it detects the presence of a group attempting to enter at once without being individually authorized or verified.

If the second level verification is passed, the drone transmits a grant access signal to the electronic lock (operation 505). The grant access signal instructs the electronic lock to unlock or become released. According to an exemplary embodiment of the inventive concept, the grant access signal may be transmitted when the drone is within a predetermined distance of the electronic lock. As such, the drone may be sufficiently close to the person and can perform the second level verification with greater accuracy.

In response to the grant access signal, the electronic lock may change status and be unlocked (operation 506), e.g., to allow the person to enter.

According to an exemplary embodiment of the inventive concept, when the electronic lock is unlocked or released, it may be temporarily deactivated.

FIGS. 6 to 10 are flowcharts illustrating operations related to second level verification by a drone according to exemplary embodiments of the inventive concept.

Figure 6:
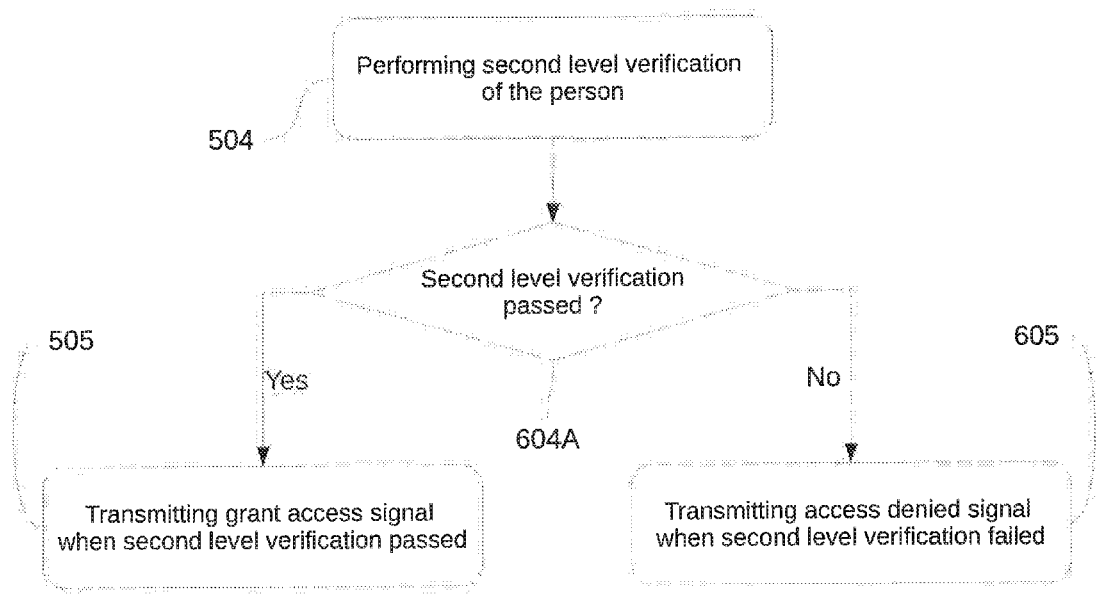
FIGS. 6 to 10 are flowcharts illustrating operations related to second level verification by a drone according to exemplary embodiments of the inventive concept.

Referring to FIG. 6, according to an exemplary embodiment of the inventive concept, after operation 504 is performed as described with reference to FIG. 5, it is determined whether the second level verification has passed (operation 604A). If the second level verification is passed, operation 505 is performed as described with reference to FIG. 5. If the second level verification is failed, the drone may transmit an access denied signal to the electronic lock (operation 605). The access denied signal instructs the electronic lock to remain locked.

Figure 7:
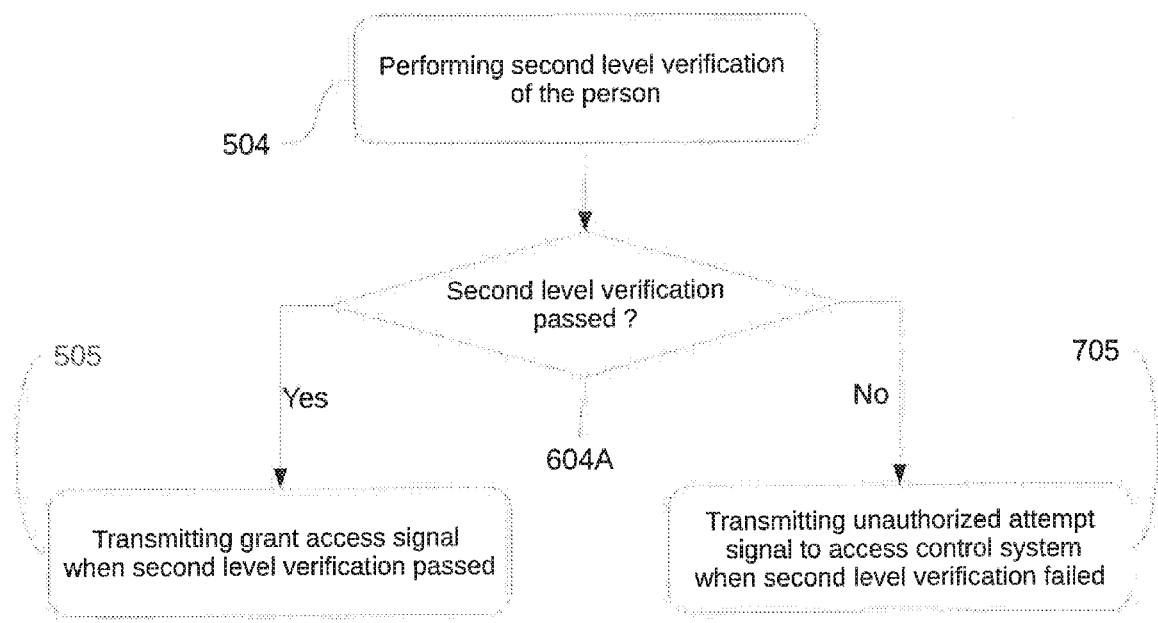

Referring to FIG. 7, according to an exemplary embodiment of the inventive concept, operations are substantially the same as those described with reference to FIG. 6. However, if the second level verification is failed, the drone may instead transmit a signal to an access control system (e.g., the access control system 403 of FIG. 4) (operation 705). The signal indicates that an unauthorized attempt has been made to unlock the electronic lock.

Figure 8:
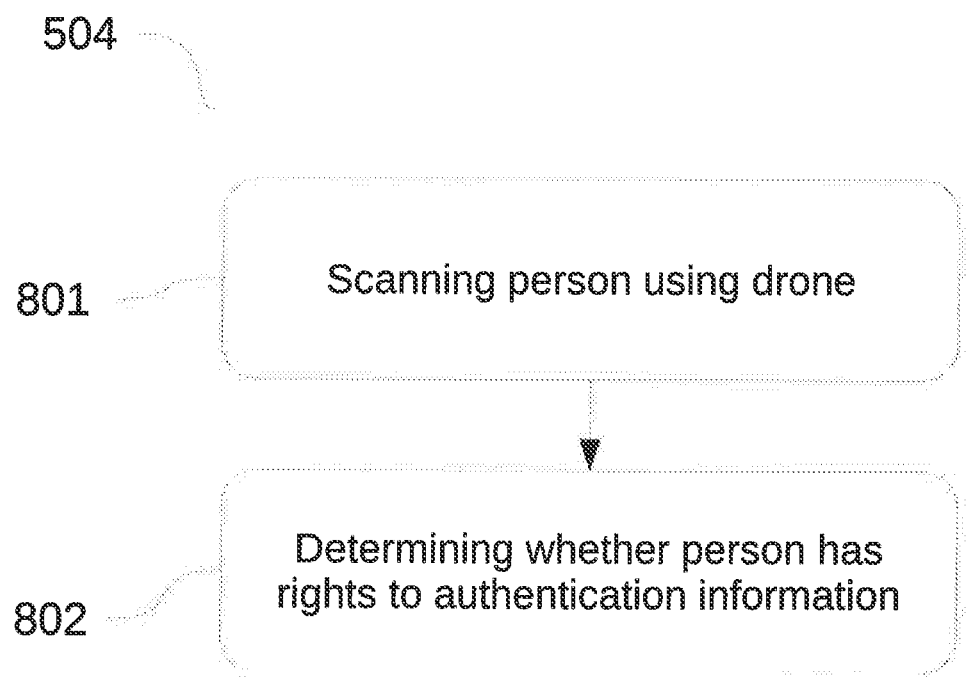

Referring to FIG. 8, according to an exemplary embodiment of the inventive concept, the second level verification of FIG. 5 (operation 504) may include additional operations. The drone may scan the person that is attempting to unlock the electronic lock (operation 801). Scanning may be performed using the camera 223, as described with reference to FIG. 2. It is determined whether the scanned person has rights to the authentication information (operation 802). The determination may be performed by the drone or an external computer (e.g., the access control system 403 of FIG. 4).

Referring to FIG. 9A, according to an exemplary embodiment of the inventive concept, the second level verification (operation 504) may include the operations described with reference to FIG. 8. Additionally, it may be determined whether the scanned person has a weapon or a destructive object (e.g., a firearm, an explosive, etc.) (operation 903A). The determination may be performed by analyzing the scan of the person. For example, software may be used to visually identify the pattern or silhouette of a gun. Potentially dangerous objects may be analyzed using deep learning. The personality analysis, as described above with reference to FIG. 3, may be taken into account when a weapon or destructive object is detected to determine whether amelioration actions by the drone are necessary.

Figure 9B:
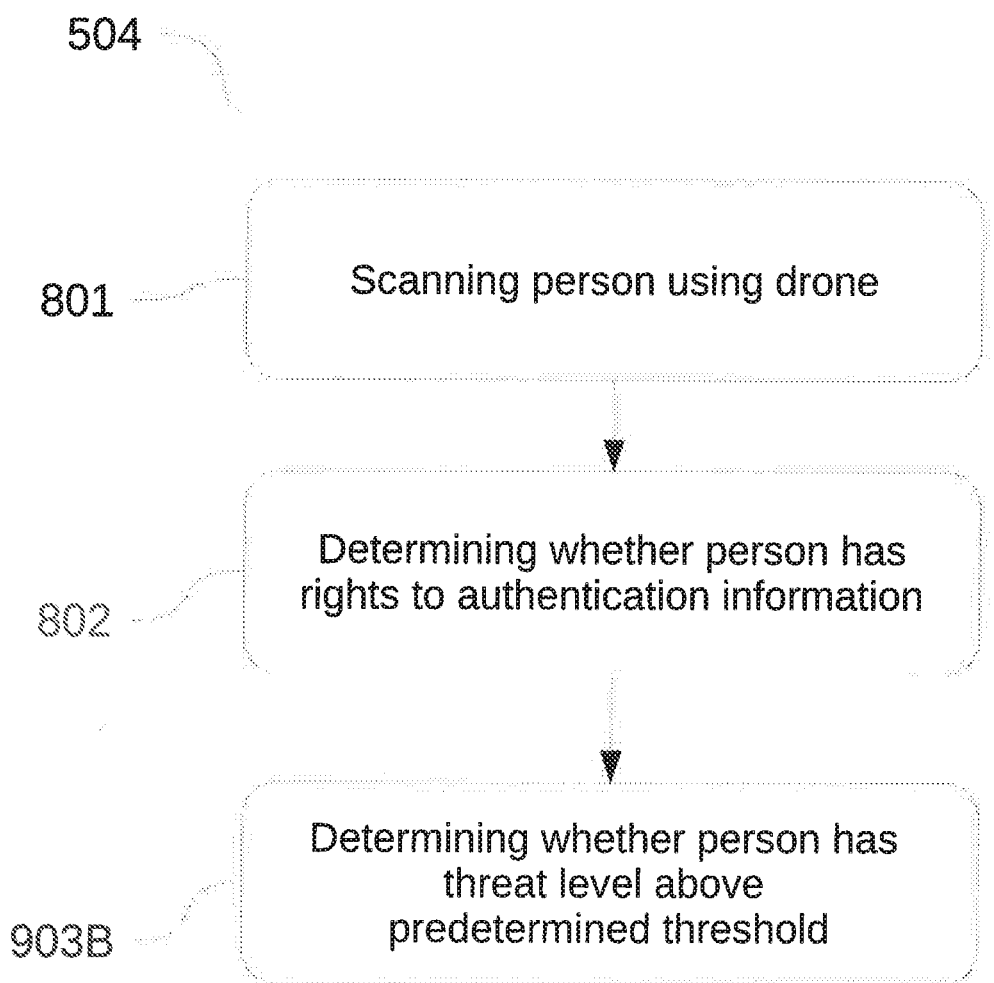

Referring to FIG. 9B, according to an exemplary embodiment of the inventive concept, the second level verification (operation 504) may include the operations described with reference to FIG. 8. Additionally, it may be determined whether the scanned person has a threat level above a predetermined threshold (operation 903B). For example, the threat level may be a numerical score based on a number of factors, such as aggressive movement, loud noise, violent interactions with the drone, presence of weapons, etc. If the threat level exceeds the predetermined threshold, appropriate action may be taken, such as notifying the authorities. The threat level may be determined using the risk analysis module 304 of FIG. 3.

Figure 10:
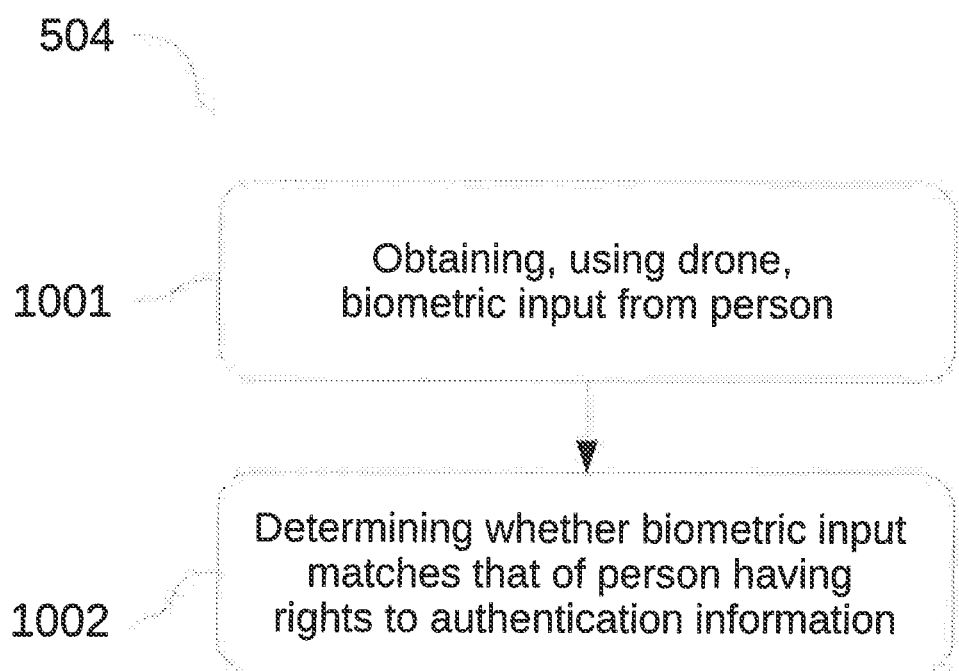

Referring to FIG. 10, according to an exemplary embodiment of the inventive concept, the second level verification of FIG. 5 (operation 504) may include additional operations. The drone may obtain a biometric input from the person that is attempting to unlock the electronic lock (operation 1001). For example, the drone may be equipped with a fingerprint scanner and may fly close to the person in order to obtain the fingerprint scan. It is determined whether the biometric input matches that of a person having rights to the authentication information (operation 1002). The determination may be performed by the drone or an external computer (e.g., the access control system 403 of FIG. 4). As an illustrative example, a person may have unlawfully obtained the access code for a keypad at a door with the electronic lock. After the access code is entered, the drone will fly to the person to obtain a biometric input (e.g., a fingerprint scan). As the person does not have rights to the access code (the authentication information), the electronic lock will remain locked.

Figure 11:
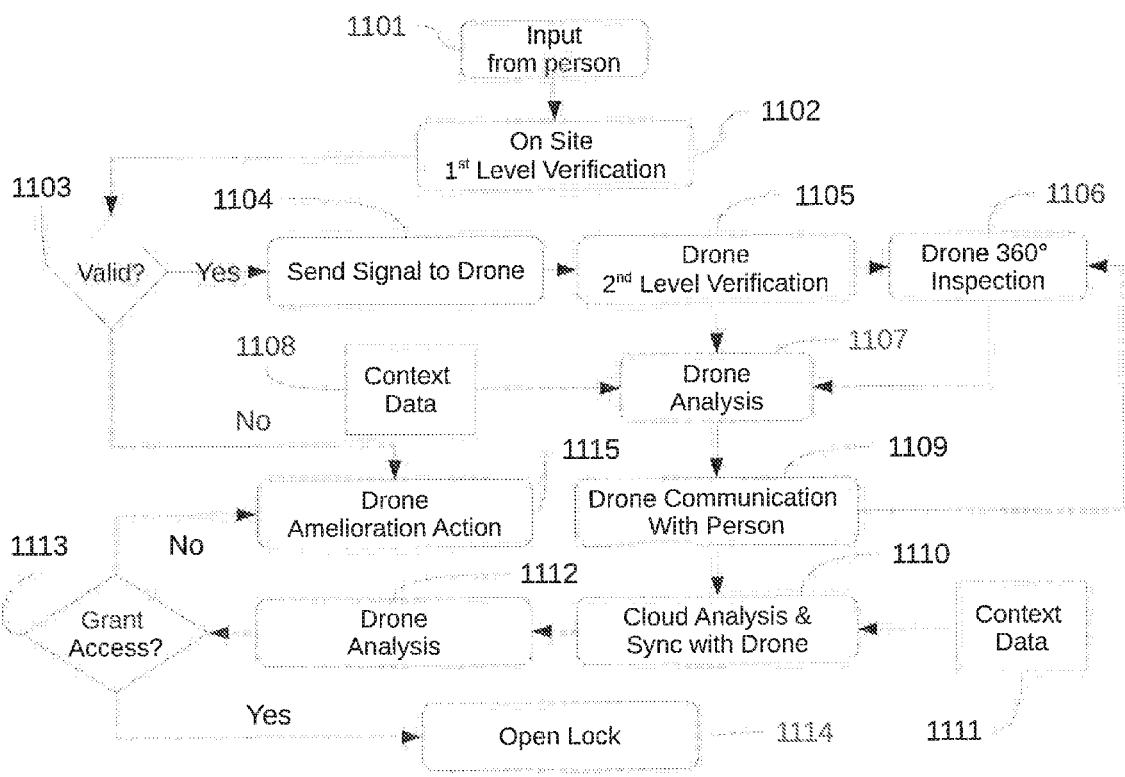
FIG. 11 illustrates an electronic lock authentication method according to an exemplary embodiment of the inventive concept.

FIG. 11 illustrates an electronic lock authentication method according to an exemplary embodiment of the inventive concept.

Referring to FIG. 11, a person may enter an input at an electronic lock (e.g., the electronic lock 101 of FIG. 1) (operation 1101). The input may be from one or more devices or sensors, e.g., a security token, a smart card, a biometric scanner, a RFID sensor, a camera, etc., as described above. Alternatively, the input may be generated when the person moves in close proximity to a motion sensor or triggers a vibration sensor disposed near the electronic lock.

A first level verification is performed on site, e.g., by the electronic lock or a connected computer (operation 1102). The first level verification may include a matching process such as biometric matching or token matching. The first level verification determines whether the input is valid (operation 1103). If the input is valid, a signal is sent to a drone or multiple drones (e.g., a drone swarm) (operation 1104). If the input is invalid, the drone may take an amelioration action (operation 1115), which will be described below.

According to an exemplary embodiment of the inventive concept, the first level verification may be skipped. For example, triggering a motion sensor near the electronic lock may prompt the signal to be sent to the drone.

After the signal is sent to the drone, the drone may fly to a position close to the person. The drone may perform a second level verification of the person (operation 1105). For example, the second level verification may include requesting a biometric input (e.g., fingerprint scan, iris scan, etc.) from the person. The drone may be equipped with multiple devices and/or sensors and optionally perform a 360 degree multimodal instrumentation and inspection of the person and surrounding area (operation 1106). The instrumentation and inspection may enable, for example, detection of weapons or presence of more than one person. The drone may be configured to collect multiple images and video and with its flying capabilities, the drone can move in all directions and provide more comprehensive information about the person and surrounding area. According to an exemplary embodiment of the inventive concept, the drone's 360 degree inspection may complement data gathered from a plurality of stationary cameras deployed near the electronic lock.

The drone may perform animate and inanimate analysis of data from the second level verification and if applicable, from the 360 degree inspection (operation 1107). The drone may analyze the person (e.g., animate) as well as objects (e.g., inanimate) in the area using image analytics, a neural net, etc., and perform a risk analysis to assess a risk level. Additionally, the drone may use context data 1108 to assist in performing the analysis. The context data 1108 may include, for example, an electronic calendar that indicates dates and times for authorized entry, or a security profile of the place secured by the electronic lock, e.g., a top security location, a meeting place for trade secrets, etc. The drone itself may perform the above-described analysis, or the drone may transmit the data it gathers to an external computer for analysis.

The drone may initiate conversation with the person (operation 1109) to gather additional information, such as asking for a name, purpose of visit, etc. The conversation may be recorded and used for voice recognition or archival purposes. If it is determined that further inspection is needed, the drone may perform the 360 degree multimodal instrumentation and inspection (operation 1106) to be analyzed (operation 1107).

The drone may communicate with a backend intelligence stored on a cloud. The cloud may perform an additional authorization analysis based on data gathered by the drone, and may synchronize with the drone (operation 1110). For example, the cloud may apply advanced animate and inanimate detection, identification, and classification techniques (e.g., deep neural net, object matching techniques, etc.). The cloud may count the number of people near the electronic lock. The cloud may perform an emotion/personality analysis of the person's cognitive state to determine if it is affected by factors such as stress, fatigue, tiredness, frustration, drugs, alcohol, etc. For example, biometric techniques may be used to detect unusually high stress levels based on perspiration, pheromones, pulse and other physiological correlates of stress. Facial expressions and body movements may be analyzed for signs of duress or emotions/expressions/motions inconsistent with the place secured by the electronic lock.

Additionally, the cloud may generate amelioration actions to be performed by the drone. The cloud may also synchronize with an access control center (e.g., the access control system 403 of FIG. 4). Finally, the cloud may log the data and update an authorization database (e.g., on IBM BLOCKCHAIN) that includes immutable records for verification and subsequent auditing. The cloud may perform these actions with the assistance of context data 1111, which may be similar to the context data 1108. The use of blockchain provides an additional level of security and privacy for collected data.

Data processing and analysis operations performed by the drone and the cloud may be interchangeable between the two. For example, the drone may perform all of the analyses and only access the cloud to log data.

The drone will process the authorization analysis performed by the cloud (operation 1112) and determine whether access should be granted (operation 1113). If access is granted, the drone may send a signal to the electronic lock to unlock or open the door (operation 1113).

However, if access is not granted, the drone may take amelioration action (operation 1115). As discussed above, if first level verification fails, the drone may take amelioration action as well. Amelioration action may include denying authorization and keeping the electronic lock locked, at the minimum. It may further include sending an informative signal to stakeholders, owners, authorities, etc. The drone may also be configured to protect itself. As such, additional amelioration actions may include taking evasive action, distracting an aggressive or malicious person until authorities arrive, flying away while flashing lights and generating an audible alert/alarm, etc. These amelioration actions may be undertaken in response to aggressive or violent behavior, such as if the drone is attacked.

According to an exemplary embodiment of the inventive concept, the authentication, verification, authentication, and amelioration actions performed by the drone may depend on the security level, internal security procedures/guidelines, safety laws, convenience requirements, etc. of the place secured by the electronic lock. The drone may perform a compliance verification along with normal analyses (e.g., visual, auditory, etc.). In other words, the place secured by the electronic lock may have particular rules and regulations regarding entry, such as prohibiting tailgating, requiring prominent display of identification badges, restricting the size of briefcases being brought into the place, etc. The compliance verification would ensure that site-specific rules and regulations are obeyed before access is granted. For example, the compliance verification may include the procedures undertaken when a group is detected in order to prevent tailgating, as described above with reference to FIG. 5.

Security features of the electronic lock and drone may be enabled/disabled or adjusted/programmed in accordance with security profiles defined by operating parameters stored in an operating parameter database. The operating parameter database may be stored within the electronic lock, the drone, the cloud, or an external computer, or may be distributed between the different components.

Regarding the methods described above with reference to FIGS. 5 to 11, operations for transmitting/receiving signals may include encrypting and decrypting the signals for increased security. Additionally, the methods may be applied to more than one electronic lock, and as described above, multiple drones may be used. As such, according to an exemplary embodiment of the inventive concept, a coordination algorithm may be used to optimize deployment of the drone(s) to monitor and perform verification for multiple electronic locks. Furthermore, power failure of the electronic lock(s) or related security devices may trigger a drone deployment sequence to send the drone(s) to monitor all of the electronic locks.

Figure 12:
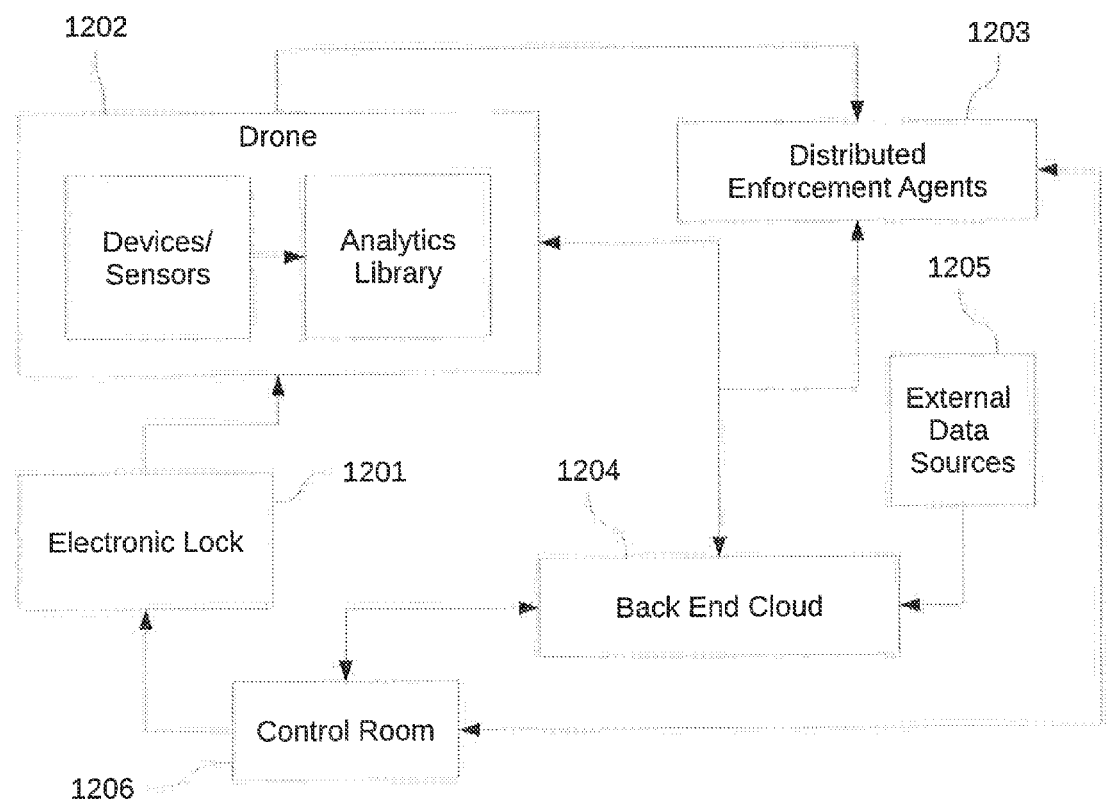
FIG. 12 illustrates a deployment model of an electronic lock authentication method according to an exemplary embodiment of the inventive concept.

FIG. 12 illustrates a deployment model of an electronic lock authentication method according to an exemplary embodiment of the inventive concept.

Referring to FIG. 12, the deployment model may include an electronic lock 1201, a drone 1202, distributed enforcement agents 1203, a back-end cloud 1204, external data sources 1205, and a control room 1206.

The electronic lock 1201 may be substantially similar to the electronic lock 101 of FIG. 1. The electronic lock 1201 may accept and authenticate an input, such as a smart card, from a person. Upon authentication, the electronic lock 1201 may send a signal to trigger the drone 1202.

The drone 1202 may be substantially similar to the UAV 102 of FIG. 1 and may include devices/sensors and an analytics library. When the drone 1202 flies to the person, the devices/sensors are configured to capture a plurality of data, e.g., text, audio, images, etc. The analytics library of the drone 1202 may analyze the plurality of data to verify the person.

Based on the analysis by the drone 1202, the drone 1202 may transmit signals or alerts to the distributed enforcement agents 1203. As an example, the distributed enforcement agents 1203 may include law enforcement and a plurality of smart phones of relevant people (e.g., via an app).

The drone 1202 may also connect with the back-end cloud 1204 for additional analytics. The back-end cloud 1204 may be a linked data model including metadata, contextual data, social media data, etc. An advanced analytics library may assist in analyzing this linked data in conjunction with the data obtained by the drone 1202. The metadata may include incident properties (e.g., the who, what, when, how, etc. about an incident), location information, timestamps, demographics, etc., extracted from data captured by the drone 1202 in the past or collected from crowdsourcing. Contextual data may come from the external data sources 1205 and include data related to weather, traffic congestion, police network, etc. Social media data may include information gathered from crowdsourcing and information about the person from social media websites. Additionally, the distributed enforcement agents 1203 (e.g., law enforcement) and the back-end cloud 1204 may be connected to share information.

The back-end cloud 1204 may communicate with the control room 1206. The control room 1206 may contain the access control system 403 of FIG. 4. Furthermore, the control room 1206 may include multiple control rooms, and may be located in, for example, a security office, a police station, etc. Within the control room 1206, one may be able to view current and past incidents related to the electronic lock 1201, control the drone 1202, unlock the electronic lock 1201, etc.

According to exemplary embodiments of the inventive concept, the electronic lock authentication methods and systems, described above with reference to FIGS. 1 to 13, may include additional features. For example, the electronic lock may include a time lock such that the electronic lock may not be unlocked before a preset time regardless of whether proper authentication information is presented. An "idle key life" feature may be included (for example, in the access control system 403 of FIG. 4) such that authentication information of an authorized person may be deactivated if it has not been used within a predetermined amount of time. The authentication information may include a variable PIN code. For electronic locks securing deposit doors, a deposit logging feature may be included.

Figure 13:
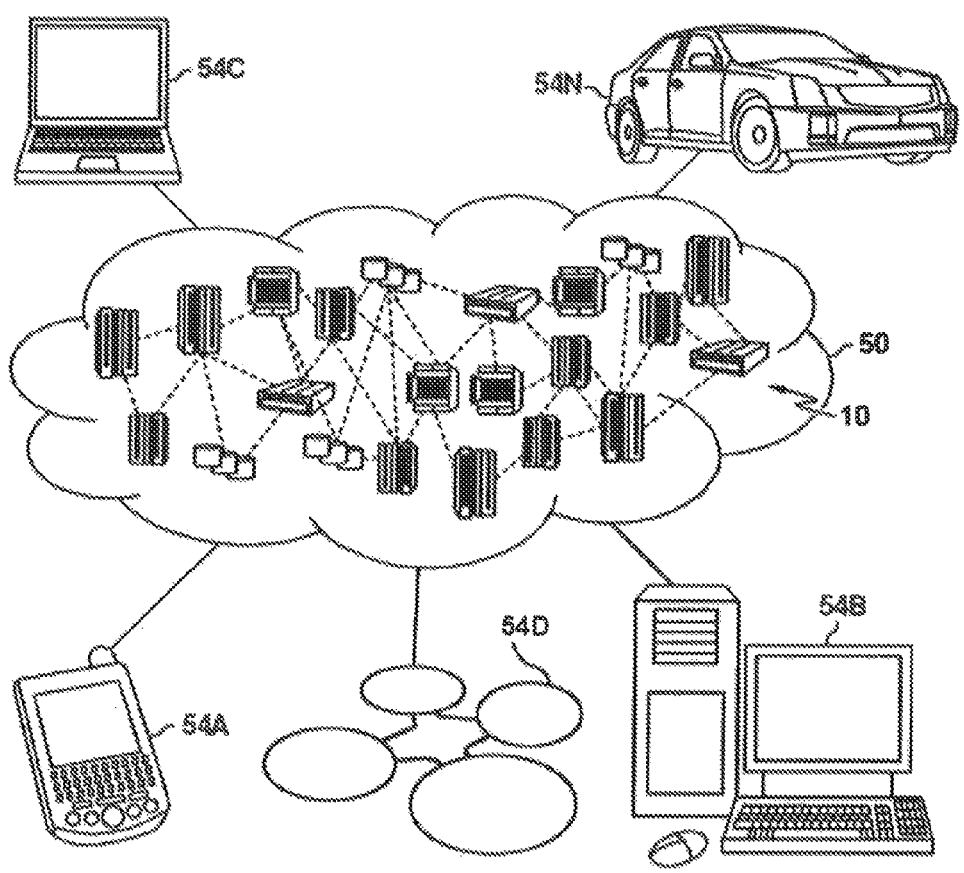
FIG. 13 depicts a cloud computing environment according to an exemplary embodiment of the inventive concept.
Figure 14:
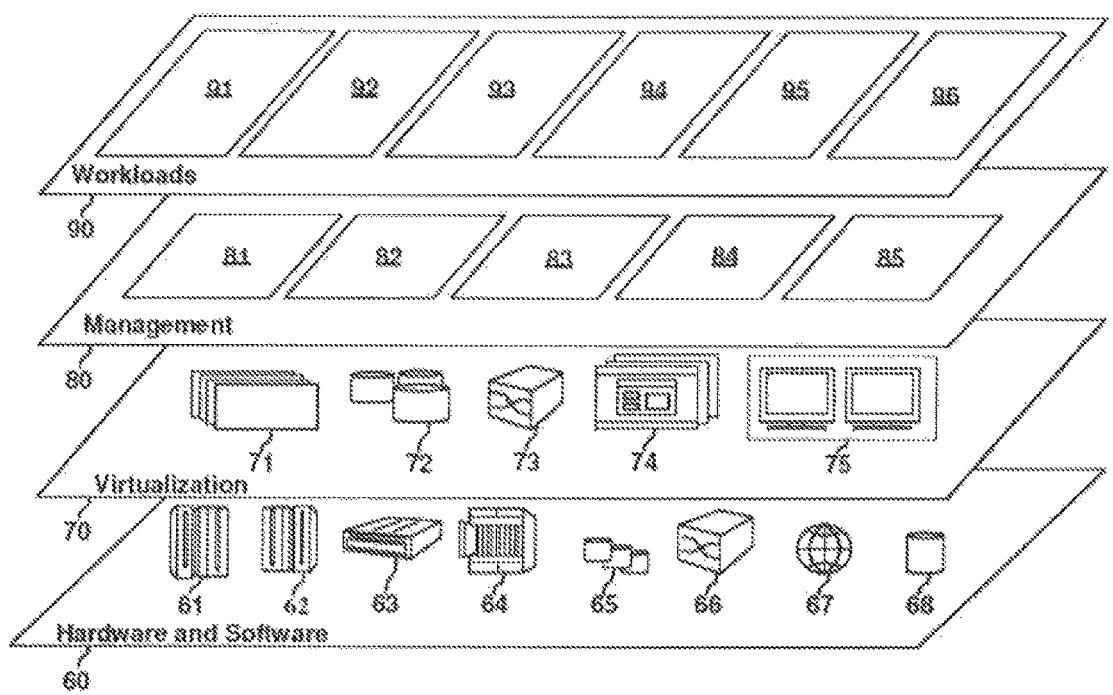
FIG. 14 depicts abstraction model layers according to an exemplary embodiment of the inventive concept.

FIG. 13 depicts a cloud computing environment according to an exemplary embodiment of the inventive concept. FIG. 14 depicts abstraction model layers according to an exemplary embodiment of the inventive concept.

It is understood in advance that although this disclosure includes a detailed description on cloud computing, implementation of the teachings recited herein are not limited to a cloud computing environment. Rather, embodiments of the inventive concept are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, a drone 54D, and/or automobile computer system 54N may communicate. The drone 54D may be similar to the drones and UAVs described above with reference to FIGS. 1 to 12. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. At least one of the drones and UAVs described above with reference to FIGS. 1 to 12 may also be included in the hardware and software layer 60. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a mobile desktop 96.

With respect to the authentication analyses and verifications described above with reference to FIGS. 1 to 12, they may be configured at the hardware and software layer 60 or the workloads layer 90 within the cloud computing environment 50.

Figure 15:
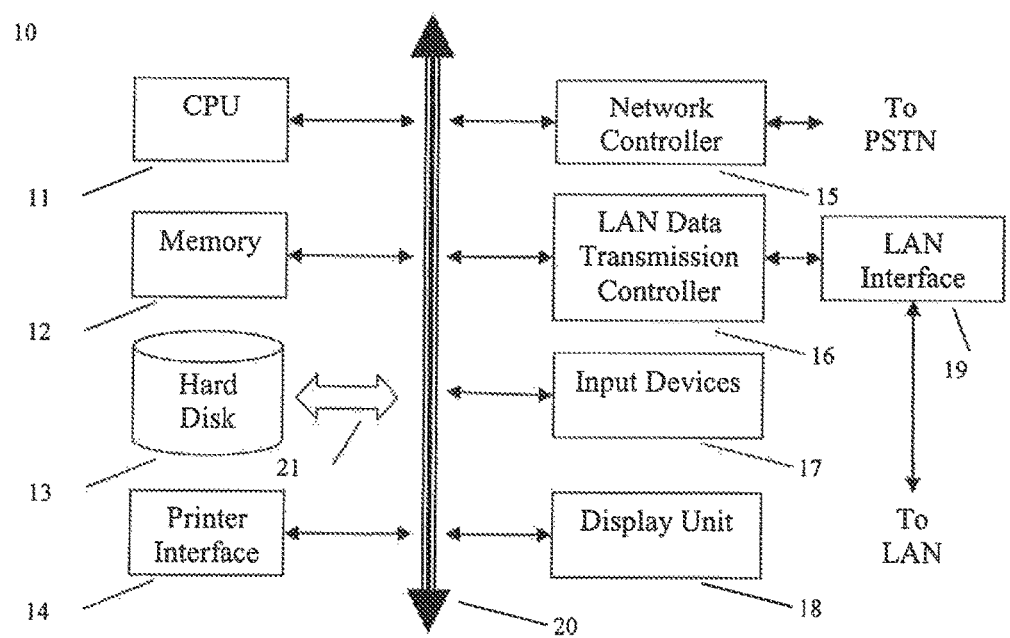
FIG. 15 illustrates an example of a computer system capable of implementing the methods according to an exemplary embodiment of the inventive concept.

FIG. 15 illustrates an example of a computer system capable of implementing the methods according to exemplary embodiments of the inventive concept. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 10 may include, for example, a central processing unit (CPU) 11, random access memory (RAM) 12, a printer interface 14, a network controller 15, a local area network (LAN) data transmission controller 16, a display unit 18, a LAN interface 19, an internal bus 20, and one or more input devices 17, for example, a keyboard, mouse etc. As shown, the system 10 may be connected to a data storage device, for example, a hard disk, 13 via a link 21.

As an example, the access control system 403 of FIG. 4 may correspond to the system 10 of FIG. 15.

Moreover, the inventive concept may be a system, a method, and/or a computer program product at any possible technical detail level of integration. The computer program product may include a computer readable storage medium (or media) having computer readable program instructions thereon for causing a processor to carry out aspects of the inventive concept.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the inventive concept may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the inventive concept.

Aspects of the inventive concept are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. See, e.g., FIGS. 5 to 11.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the inventive concept. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Through the electronic lock authentication system and method using a drone, as described above, lower cost, increased security, and greater flexibility may be achieved. For example, in order to replicate the 360 degree coverage obtainable by a flying drone, numerous stationary cameras would need to be deployed to cover all angles and blind spots, which would increase costs. Additionally, by adding an additional layer of security through the drone, access rights are more distributed, which may prevent fraud and collusion to illegitimately gain access. Distributed access rights along with selective enablement/disablement of security features through security profiles allows for greater flexibility.

While the inventive concept has been shown and described with reference to exemplary embodiments thereof, it will be understood by those of ordinary skill in the art that various changes in form and detail may be made therein without departing from the spirit and scope of the inventive concept as defined by the following claims.

What is claimed is:

1. An electronic lock authentication method using a drone, comprising:
   receiving, at an electronic lock, authentication information input by a person;
   performing, at the electronic lock, a first level verification of the authentication information;
   transmitting, from the electronic lock to a drone, a drone request signal, wherein the drone request signal instructs the drone to proceed to the electronic lock and perform a second level verification of the person when the first level verification has passed;
   performing, with the drone, the second level verification of the person;
   transmitting, from the drone to the electronic lock, a grant access signal, wherein the grant access signal instructs the electronic lock to unlock when the second level verification has passed; and
   unlocking the electronic lock in response to the grant access signal.

2. The method of claim 1, wherein the authentication information includes an alphanumeric code, a password, a passphrase, a security token, a biometric input, a radio frequency identification, or a user gesture.

3. The method of claim 1, wherein the drone is an unmanned aerial vehicle.

4. The method of claim 1, wherein the electronic lock is disposed on or near a door.

5. The method of claim 1, further comprising:
   transmitting, from the drone to the electronic lock, an access denied signal, wherein the access denied signal instructs the electronic lock to remain locked when the second level verification has failed.

6. The method of claim 1, further comprising:
   transmitting, from the drone to an access control system, a signal indicating that an unauthorized attempt has been made to unlock the electronic lock when the second level verification has failed.

7. The method of claim 1, wherein the second level verification comprises:
   scanning the person using the drone; and
   determining whether the scanned person has rights to the authentication information.

8. The method of claim 7, further comprising determining whether the scanned person has a weapon or a destructive object.

9. The method of claim 7, further comprising determining whether the scanned person has a threat level above a predetermined threshold.

10. The method of claim 1, wherein the second level verification comprises:
    obtaining, using the drone, a biometric input from the person; and
    determining whether the biometric input matches that of a person having rights to the authentication information.

11. The method of claim 1, wherein the grant access signal is transmitted from the drone to the electronic lock when the drone is within a predetermined distance of the electronic lock.

12. A system for authenticating an electronic lock using an unmanned aerial vehicle (UAV), comprising:
    an electronic lock including a locking mechanism, an input, and a transceiver, wherein the input is configured to receive authentication information from a person, and the transceiver is configured to output a drone request signal when the authentication information has passed; and
    a UAV including a transceiver and a processor, wherein the transceiver of the UAV is configured to receive the drone request signal, and the processor is configured to instruct the UAV to fly to a location near the electronic lock and to verify the identity of the person, wherein when the identity of the person is verified, the transceiver of the UAV outputs a grant access signal instructing the electronic lock to unlock itself.

13. The system of claim 12, wherein the UAV includes a camera or a biometric input.

14. The system of claim 13, wherein the UAV includes an analytics library connected to the processor and used to analyze data captured by the camera or the biometric input.

15. The system of claim 12, wherein the processor comprises:
    a real-time image and video analytics circuit configured to perform facial recognition;
    a linguistics circuit configured to analyze audio data;
    a counting circuit configured to count a number of people in proximity to the electronic lock; and
    a risk analysis circuit configured to determine a probability of risk-related behavior.

16. The system of claim 12, further comprising:
    an access control system.

17. A method of releasing a lock using a drone, comprising:
    performing, by the lock, a first verification step to authenticate a first person;
    transmitting a first signal from the lock to the drone, wherein the first signal indicates the first person has passed the first verification step;
    receiving, at the drone, the first signal;

moving the drone to a proximate location of the first person in response to the first signal;

obtaining, with the drone, authentication information of the first person; and transmitting, from the drone, a second signal based on the authentication information, wherein the second signal indicates that the first person has passed a second verification step.

18. The method of claim 17, wherein the first signal is wirelessly received at the drone and the second signal is wirelessly transmitted from the drone.

19. The method of claim 17, wherein the second signal instructs the lock to become released.

20. The method of claim 19, wherein when the lock is released, it is temporarily deactivated.

* * * * *